United States Patent [19]
Maier et al.
[11] 3,899,758
[45] Aug. 12, 1975

[54] VARIABLE INDUCTIVE RESONANT CIRCUIT ARRANGEMENT HAVING A DIAMAGNETIC CORE FOR THE UHF RANGE

[75] Inventors: Gerhard Maier, Schwenningen; Bertram Fischer, Deisslingen, both of Germany

[73] Assignee: GTE International, Stamford, Conn.

[22] Filed: May 1, 1974

[21] Appl. No.: 465,859

[52] U.S. Cl. ........... 333/70 S; 333/73 R; 333/82 A; 334/15; 334/45; 334/65
[51] Int. Cl.[2] ..................... H03H 13/00; H03H 5/12
[58] Field of Search .......................... 334/15, 41–45, 334/74–77, 65, 70, 89; 333/70 S, 73 R, 73 S, 76, 82 R, 82 A; 336/200

[56] References Cited

UNITED STATES PATENTS 2,611,088 9/1952 Harvey ............................. 333/82 R
2,656,483 10/1953 Apstein ............................ 333/82 R
3,484,697 12/1969 Abend ............................... 336/200

*Primary Examiner*—Alfred E. Smith
*Assistant Examiner*—Wm. H. Punter
*Attorney, Agent, or Firm*—Theodore C. Jay, Jr.; Robert T. Orner; Thomas H. Buffton

[57] ABSTRACT

This invention relates to a variable, predominantly inductive resonant circuit arrangement for the ultra high frequency (UHF) range, in particular for transistorized UHF television tuners, that are tuned with varactor dividers, whereby at least two such resonant circuit arrangements are employed per receiver and take the form of a printed circuit with a coil arrangement of less than one turn.

3 Claims, 1 Drawing Figure

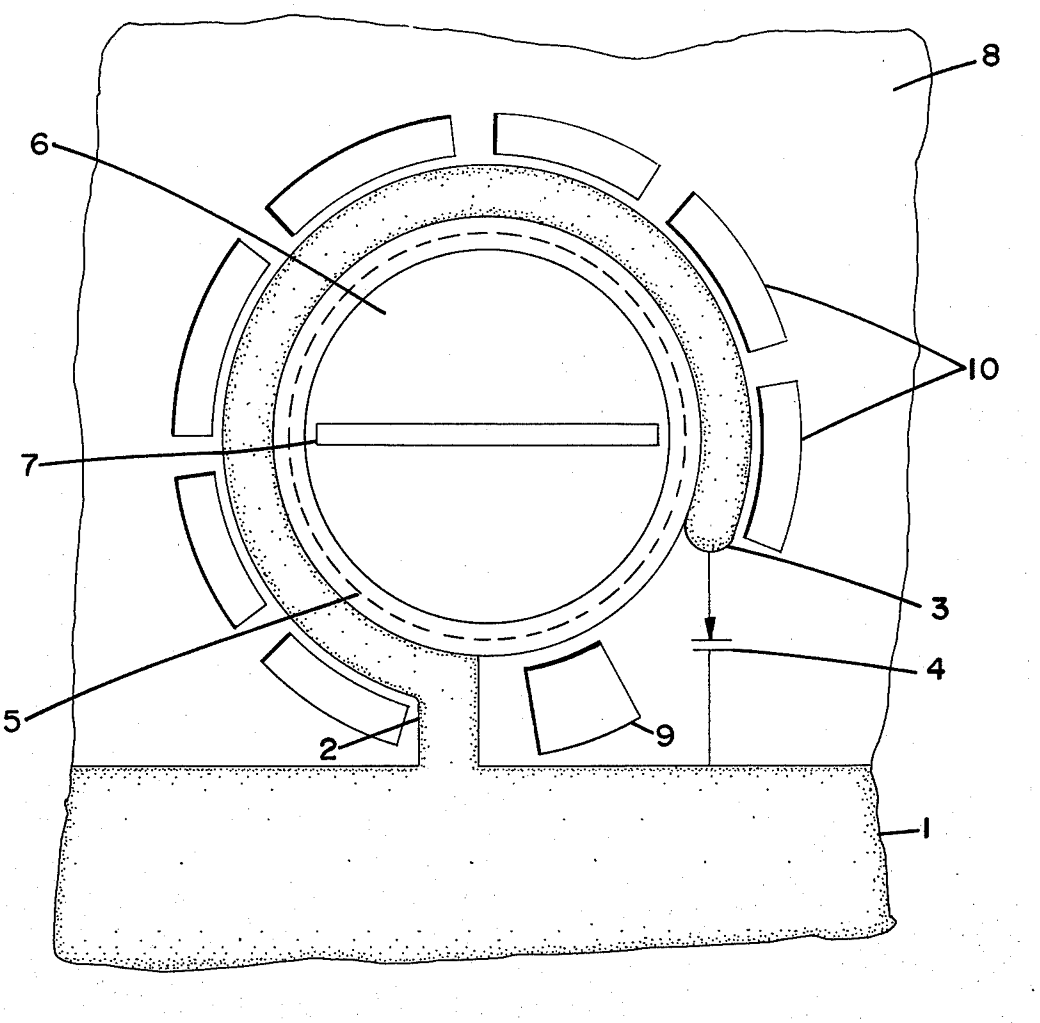
8
6
10
7
3
4
5
2
9
1

VARIABLE INDUCTIVE RESONANT CIRCUIT ARRANGEMENT HAVING A DIAMAGNETIC CORE FOR THE UHF RANGE

BACKGROUND OF THE INVENTION

Resonant circuit arrangements for the UHF range are constructed either of discrete components or as cavity resonators. Such constructions are typically disclosed by German Patent No. 1,277,392 and German Patent No. 1,111,682 or German Provisional Patent No. 1,253,778 and German Patent No. 1,271,788 respectively.

Since cavity resonators are quite expensive to manufacture and entail fairly high alignment costs because of the inherent large tolerances which call for time-consuming adjustment by varying the wave impedance for instance, other approaches have been employed. As disclosed by German Patent No. 1,277,392, there is provided a structure in the form of an inductive tuning device with an arcuate tuning portion extending over less than 360° and having a stationary wiper.

Another solution is taught by German Patent No. 1,111,682 which discloses Lecher wires of arcuate configuration with a sliding contact bar. Such resonant circuits for UHF have been produced in the form of printed circuits, as part of the miniaturization process, to simplify manufacture and reduce production costs.

This development gave rise to quasi-cavity resonators and strip-line tuners as disclosed by German Patent No. 1,296,225 and German Provisional Patent No. 1,271,222. Moreover, transistorized tuner circuits with varactor diodes are known in the art and are currently in general use as revealed by German Provisional Patent No. 1,198,425; German Patent No. 1,271,788; and German Provisional Patents 1,271,789; 1,766,734; and 1,766,682. Although UHF resonators with discrete inductances calculated according to the Thomson (Kelvin) formula exhibit better field distribution and are simpler to screen than resonant cavities, resonant cavities are much more widely used in tuner circuits.

These resonant circuit arrangements, which can take the form of transmission lines, strip-line circuits, cavity resonators or quasi-cavity resonators, are basically coaxial resonant circuits with a more or less complicated spatial field configurations peculiar to these arrangements. In theory, cavity resonators possess a homogeneous field configuration, but this is disturbed by the coupling means required for taking energy from the cavity and the loops for feeding energy into the cavity. In many cases the inner conductor has to be bent for alignment purposes which results in partial changes in wave impedance. This, in turn, creates further disturbance of field distribution.

In the upper UHF range in particular, coaxial resonant circuits are superior to discrete arrangements. However, the effective screening of coaxial resonant circuits, to satisfy the usual requirements with respect to reradiation, for example, presents difficulties. Because of the requisite spatial field distribution, the surrounding parts of the housing also carry energy.

In an attempt to attain immunity against interfering radiation, simplicity of alignment, and partial or full package integration, there is again a tendency to favor discrete circuits using air-core coils or core coils with several turns. However, discrete circuits with core coils have distinct drawbacks such as range limitations due to undesirable stray capacitances and complicated alignment due to larger tolerances.

In particular, the use of printed coils led to divided capacitances resulting in LC series circuits in the UHF range. Unfortunately, the LC series circuits had a resonance within the reception range and tended to bleed-off the signal in a manner frequently referred to as resonant suckout.

OBJECTS AND SUMMARY OF THE INVENTION

An object of the present invention is to provide a resonant circuit arrangement using low-cost materials. Another object of the invention is to provide a resonant circuit arrangement manufactured to close tolerances and easy to align. Still another object of the invention is to provide an enhanced resonant circuit arrangement which requires a minimum of space and does not have the previously-mentioned disadvantages.

These, and other objects, advantages and capabilities are achieved in one aspect of the invention by a variable inductive resonant circuit arrangement in the form of a printed circuit with less than one turn surrounding a threaded member of insulating material having a diamagnetic core and disposed within an aperture of a printed circuit.

BRIEF DESCRIPTION OF THE DRAWING

The sole FIGURE illustrates a preferred form of resonant circuit arrangement.

DESCRIPTION OF THE PREFERRED EMBODIMENT

The present invention, together with other and further objects, advantages and capabilities thereof will best be understood when considered in conjunction with the following disclosure, appended claims, and accompanying drawing.

Referring to the drawing, a predominately inductive resonant circuit arrangement includes an arcuate conductor strip extending less than 360° and having a web 2 connected to chassis ground 1, which may be referred to as the "cold end". The arcuate conductor strip has a "hot end" 3 connected by a varactor diode 4 to chassis ground 1.

A threaded member of insulating material 5 is disposed within a concentric aperture in the base material 8 of a printed circuit. A preferred form of base material 8 is a low-cost resin-impregnated paper. A diamagnetic core 6, preferably brass, is disposed within the insulating material 5. Moreover, a screwdriver slot 7 is provided for adjustment of the core 6.

The base material 8 has a window or aperture 9 positioned intermediate the cold and hot ends, 2 and 3, of the arcuate conductor strip. This aperture 9 serves to effect a reduction in stray capacitances. Also, a plurality of arcuate apertures 10 are disposed along the outer periphery of the arcuate conductor strip for effecting improved isolation and quality factors of the arrangement.

At least two of these resonant circuit arrangements are required for the usual type of UHF tuner circuit. For example, an input circuit and an oscillator circuit each require one of the above-mentioned resonant circuits. Networks with more than two resonant circuits, using a plurality of band-pass filters for example, can be achieved with the afore-described arrangements in a minimum of space.

Specimen UHF tuners conforming to the invention function efficiently with a ring-shaped or arcuate conductor strip having a means radius R of approximately 4 to 6 mm. The arcuate conductor strip has a width $b$ which is preferably in the range of 0.5 to 2.0 mm. Thus, the outside diameter of the arcuate conductor strip is in the range of about 8.5 to 14.0 mm while the optimum length for good tuning ability is about 270°.

Additionally, the dimension date result from the following formulas by starting first with the formula of a C-loaded λ/4 cavity resonator and deducing the relative length $$\frac{l_r}{cm} = \frac{v}{\omega_r} \cdot \text{arc tan} \frac{1}{\omega_r \times c \times Z_L} \text{ with } v = \frac{c}{\sqrt{\mu_r \times \epsilon_r}}$$

cm = centimeters $Z_L$ = wave impedance of resonator c = velocity of light $\mu_r$ = relative permeability constant $\epsilon_r$ = relative dielectric constant $\omega = 2\pi f$ (angular frequency)

A transformation into concentric arrangement having a new inductance is then achieved by comparing the phase and the value.

$$\frac{L\text{ (equiv)}}{nH} = \frac{Z_L}{\pi f}\left(\frac{1}{\frac{2\pi f l_r}{v} \cdot csc^2\left(\frac{2\pi f l_r}{v}\right) + ctn\left(\frac{2\pi f l_r}{v}\right)}\right) \cdot 10^9$$

The geometric dimensions of the coaxial coil are calculated from:

$$\frac{L\text{ (equiv)}}{nH} = 4\pi R\left(l_r\left(\frac{8R}{b}\right) - 0.5\right)$$

nH = nano-Henry

While there has been shown and described what is at present considered the preferred embodiment of the invention, it will be obvious to those skilled in the art that various changes and modifications may be made therein without departing from the invention as defined by the appended claims.

What is claimed is:

1. A variable, predominately inductive resonant circuit assembly for the UHF range of a transistorized UHF television employing varactor tuners comprising:
   a threaded member of insulating material disposed within an aperture of a printed circuit board;
   an arcuate conductor strip having apertures surrounding the extreme periphery thereof and having less than one turn surrounding and affixed to said threaded member of insulating material;
   a core of diamagnetic material disposed within said threaded member of insulating material, said core including means for adjustment; and
   varactor diode means coupling said arcuate conductor strip to a potential reference level.

2. A variable, predominately inductive resonant circuit assembly for the UHF range of a transistorized UHF television employing varactor tuners comprising:
   a threaded member of insulating material disposed within an aperture of a printed circuit board;
   an arcuate conductor strip having less than one turn surrounding and affixed to said threaded member of insulating material, said arcuate conductor strip having hot and cold ends with an aperture in the base material intermediate said hot and cold ends;
   a core of diamagnetic material disposed within said threaded member of insulating material, said core including means for adjustment; and
   varactor diode means coupling said arcuate conductor strip to a potential reference level.

3. A variable, predominately inductive resonant circuit assembly for a UHF range, in particular transistorized UHF television tuners, that are tuned with varactor diodes, whereby at least two of said resonant circuit assemblies are employed per receiver and take the form of a printed circuit with less than one turn, characterized by the fact that the assembly consists of a flat, circular loop on the printed tuner circuit and therewithin, in a round hole in the circuit board, a threaded member of insulating material, provided with a diamagnetic core and that the dimensions thereof are determined by the following equations, known per se, proceeding from the formula for a capacitor-loaded, quarter-wave cavity resonator and the relative length $$\frac{l_r}{cm} = \frac{v}{\omega_r} \times \text{arc tan} \frac{1}{\omega_r \times c \times Z_L} \text{ wherein } v = \frac{c}{\sqrt{\mu_r \epsilon_r}}$$

whereby $Z_L$ = wave impedance

V = specific velocity

C = velocity of light $u_r$ = relative permeability $E_r$ = relative permittivity and then transformation in a concentric arrangement with new inductance through comparison of phase and magnitude given by:

$$\frac{L\text{ (equiv)}}{nH} = \frac{Z_L}{\pi x f} \times \left(\frac{1}{\frac{2\pi f l_r}{v} \times csc^2\left(\frac{2\pi f l_r}{v}\right) + ctn\left(\frac{2\pi f l_r}{v}\right)}\right) \cdot 10^9$$

and finally the geometric dimensions of the concentric coil are determined, whereby $$\frac{L\text{ (equiv)}}{nH} = 4\pi R\left(l_r\left(\frac{8R}{b}\right) - 0.5\right)$$

ln = natural log (for one turn and a circular coil)

* * * * *